(12) United States Patent
Suzuki et al.

(10) Patent No.: US 8,091,670 B2
(45) Date of Patent: Jan. 10, 2012

(54) ALL TERRAIN VEHICLE

(75) Inventors: Yasuhiro Suzuki, Shizuoka (JP);
Hiroyuki Fujimoto, Shizuoka (JP);
Hikaru Moriya, Shizuoka (JP); Satoshi Kubota, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 216 days.

(21) Appl. No.: 12/604,419

(22) Filed: Oct. 23, 2009

(65) Prior Publication Data
US 2011/0094813 A1 Apr. 28, 2011

(51) Int. Cl.
*B60K 13/04* (2006.01)
(52) U.S. Cl. ............... 180/89.2; 180/309; 180/89.1
(58) Field of Classification Search ........... 180/89.1, 180/89.2, 309, 312, 311
See application file for complete search history.

(56) References Cited

U.S. PATENT DOCUMENTS

| 7,967,100 B2* | 6/2011 | Cover et al. ............... 180/312 |
| 2006/0270503 A1 | 11/2006 | Suzuki et al. |
| 2009/0183937 A1* | 7/2009 | Yamamura et al. ......... 180/89.2 |
| 2010/0078255 A1* | 4/2010 | Miura ........................ 180/309 |

* cited by examiner

*Primary Examiner* — Ruth Ilan
(74) *Attorney, Agent, or Firm* — Keating & Bennett, LLP

(57) ABSTRACT

In an all terrain vehicle, an engine unit is at least partially disposed under a seat. An exhaust pipe includes a first portion, a second portion and a third portion. The first portion is connected to a rear surface of the engine unit, and extends rearward therefrom. The second portion is connected to the first portion, and has a U-shaped configuration. The third portion is connected to the second portion, and extends forward therefrom. A muffler is connected to the exhaust pipe. The muffler is arranged such that the first portion and the third portion at least partially overlap with an area located between two tangent lines of the muffler. The tangent lines of the muffler are perpendicular or substantially perpendicular to a tangent line shared by the first portion and the third portion.

8 Claims, 10 Drawing Sheets

ALL TERRAIN VEHICLE

BACKGROUND OF THE INVENTION

1. Field of the Invention

The present invention relates to an all terrain vehicle.

2. Description of the Related Art

US Patent Publication No. US 2006/0270503 A1 discloses an example of the conventional all terrain vehicle in which an engine unit is disposed under a seat and an exhaust pipe is connected to the rear surface of the engine unit. In the vehicle, a muffler is disposed rearward of the seat, and the exhaust pipe is connected to the muffler. The exhaust pipe is disposed transversely lateral to the muffler. Plural portions of the exhaust pipe are bent in a U-shape.

As described above, when the exhaust pipe is connected to the rear surface of the engine unit, the entire vehicle may be enlarged in a large longitudinal direction. In order to avoid this, it is desirable to form the exhaust pipe in a U-shape by bending it in the longitudinal direction of the vehicle. This is because engine performance determines the necessary length of the exhaust pipe and therefore there is a constraint against shortening the length of the exhaust pipe. When the exhaust pipe is bent in a U-shape, it is desirable to bend the exhaust pipe in a gently curved shape for reducing its ventilation resistance. In this case, however, a large space is necessary for disposing the exhaust pipe. Additionally, the muffler is connected to the exhaust pipe. Therefore, the vehicle needs a space for accommodating the exhaust pipe and the muffler. When a large space is necessary for disposing the exhaust pipe and the muffler, this makes it difficult to compactly form the vehicle.

SUMMARY OF THE INVENTION

In view of the above, preferred embodiments of the present invention provide a compact all terrain vehicle including an exhaust pipe having a necessary length.

An all terrain vehicle according to a preferred embodiment of the present invention includes a pair of right and left front wheels, at least a pair of right and left rear wheels, a vehicle body frame, a pair of right and left first roof supports, a pair of right and left second roof supports, a pair of right and left roof members, a seat, an engine unit, an exhaust pipe and a muffler. The vehicle body frame supports the front wheels and the rear wheels. The first roof supports are provided at lateral sides of the vehicle body frame in a transverse direction of the vehicle. Each of the first roof supports includes a pipe member extending in a substantially vertical direction of the vehicle. The second roof supports are provided at the lateral sides of the vehicle body frame in the transverse direction of the vehicle. The second roof supports are disposed rearward of the first roof supports in a longitudinal direction of the vehicle. Each of the second roof supports includes a pipe member extending in the substantially vertical direction of the vehicle. The right roof member connects an upper portion of the right first roof support and an upper portion of the right second roof support, whereas the left roof member connects an upper portion of the left first roof support and an upper portion of the left second roof support. The seat is disposed forward of rear ends of the second roof supports in the longitudinal direction of the vehicle in a side view of the vehicle. The engine unit is at least partially disposed under the seat. The exhaust pipe includes a first portion, a second portion and a third portion. The first portion is connected to a rear surface of the engine unit, and extends rearward therefrom in the longitudinal direction of the vehicle. The second portion is connected to the first portion, and is formed in a U-shape. The third portion is connected to the second portion, and extends forward therefrom in the longitudinal direction of the vehicle. The muffler is connected to the exhaust pipe. The muffler is arranged such that both of the first portion and the third portion at least partially overlap with an area formed between two tangent lines of the muffler in a cross-section at a predetermined longitudinal position of the vehicle. The tangent lines of the muffler are positioned perpendicular or substantially perpendicular to a tangent line shared by the first portion and the third portion.

According to the all terrain vehicle of a preferred embodiment of the present invention, the muffler is arranged such that the first portion and the third portion overlap with the area formed between two tangent lines of the muffler perpendicular or substantially perpendicular to the tangent line shared by the first and third portions. Therefore, it is possible to dispose the muffler and the exhaust pipe in a small space and reliably keep the necessary length of the exhaust pipe. As a result, it is possible to compactly form the vehicle.

Other features, elements, steps, characteristics and advantages of the present invention will become more apparent from the following detailed description of preferred embodiments of the present invention with reference to the attached drawings.

DETAILED DESCRIPTION OF THE PREFERRED EMBODIMENTS

Figure 1:
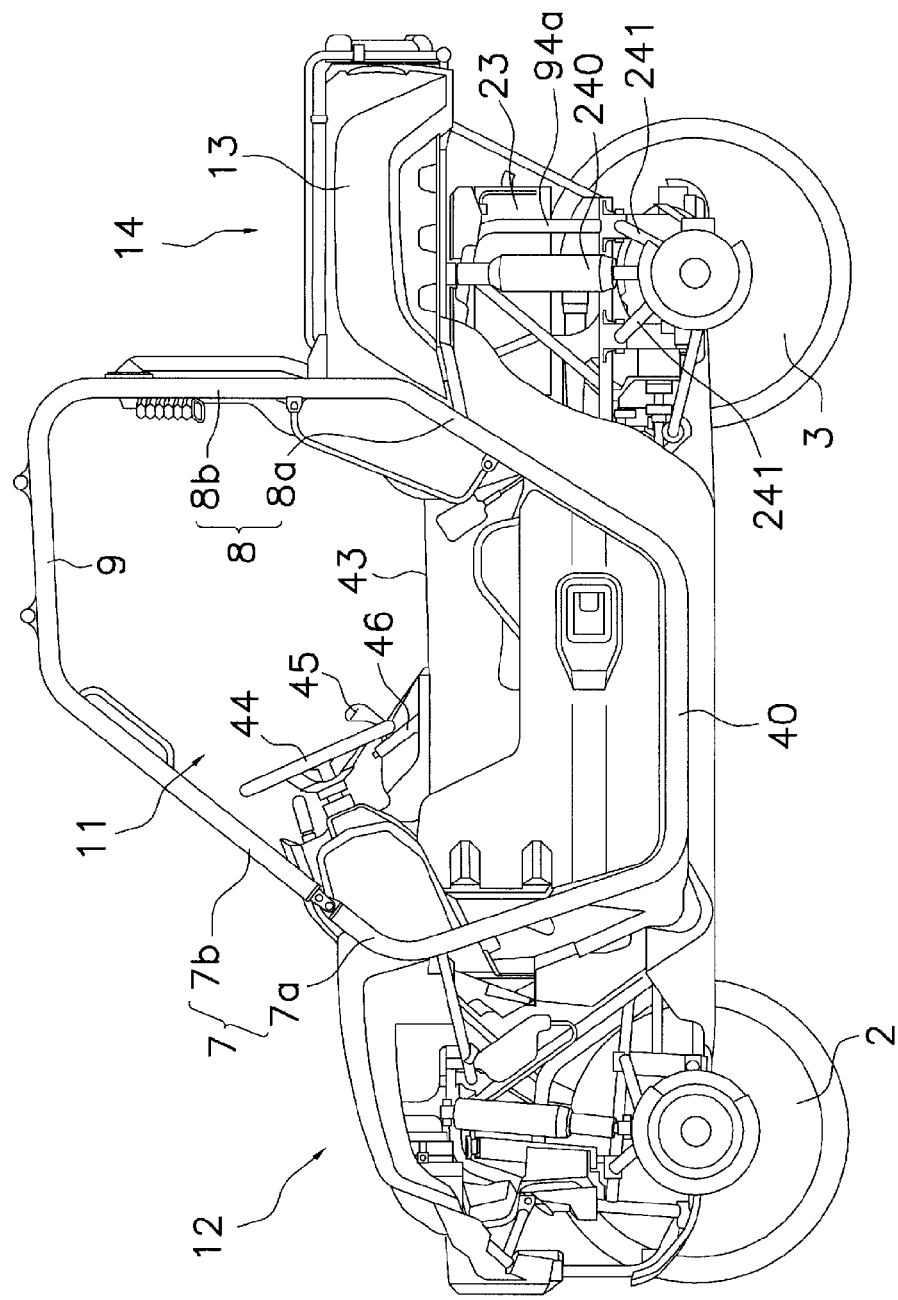
FIG. 1 is a side view of an all terrain vehicle according to a preferred embodiment of the present invention.
Figure 2:
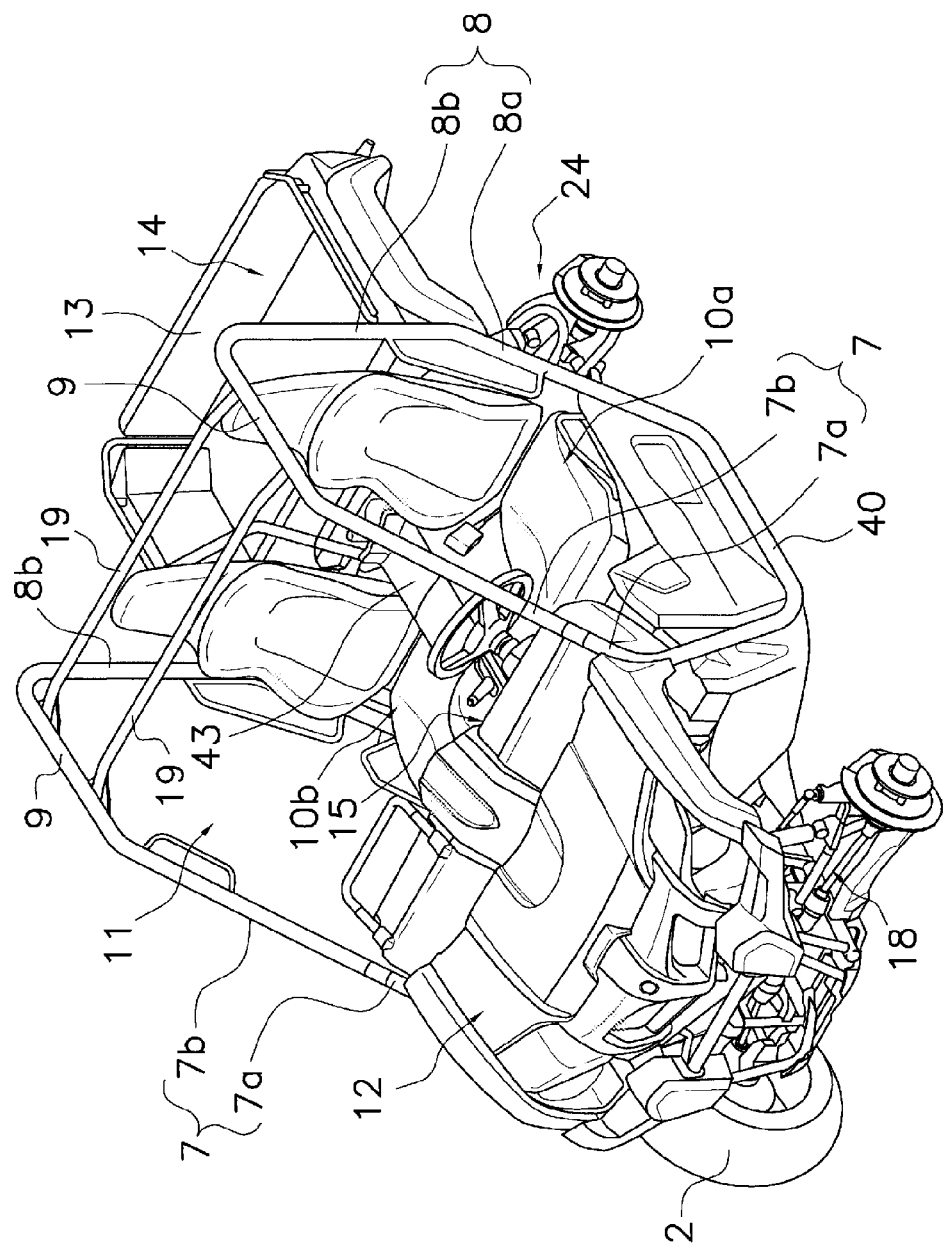
FIG. 2 is a perspective view of the appearance of the all terrain vehicle.

An all terrain vehicle according to preferred embodiments of the present invention will be hereinafter explained with reference to the attached figures. FIGS. 1 and 2 illustrate the all terrain vehicle that a left front wheel and a left rear wheel are removed. In the present specification, directional terms "front", "rear", "right" and "left" and their related terms mean directions seen in a condition that a driver and/or a passenger take a seat, excluding special occasions. Similarly, a term "longitudinal direction" means a front-to-rear direction of the vehicle in the condition that a driver and/or a passenger take a seat. On the other hand, a term "transverse direction" means a right-to-left direction of the vehicle in the condition that a driver and/or a passenger take a seat.

The all terrain vehicle, illustrated in FIGS. 1 to 6, includes a pair of right and left front wheels 2, a pair of right and left rear wheels 3, a vehicle body frame 4, an engine unit 5, a power transmission mechanism 6, and roof forming members. The vehicle body frame 4 supports the front wheels 2 and the rear wheels 3. The roof forming members preferably include a pair of first roof supports 7, a pair of second roof supports 8, and a pair of roof members 9. Additionally, the all terrain vehicle includes a cabin 11, a vehicle body front portion 12 and a vehicle body rear portion 14. The cabin 11 functions as an accommodation space for a driver and/or a passenger. Seats 10a and 10b are disposed in the interior of the cabin 11. The vehicle body front portion 12 includes the front wheels 2. The vehicle body front portion 12 is disposed forward of the cabin 11. The vehicle body rear portion 14 includes the rear wheels 3 and a cargo 13. The vehicle body rear portion 14 is disposed rearward of the seats 10a and 10b. A front panel 15 is disposed between the cabin 11 and the vehicle body front portion 12. The cabin 11 and the vehicle body front portion 12 are thus sectioned apart by the front panel 15.

Figure 4:
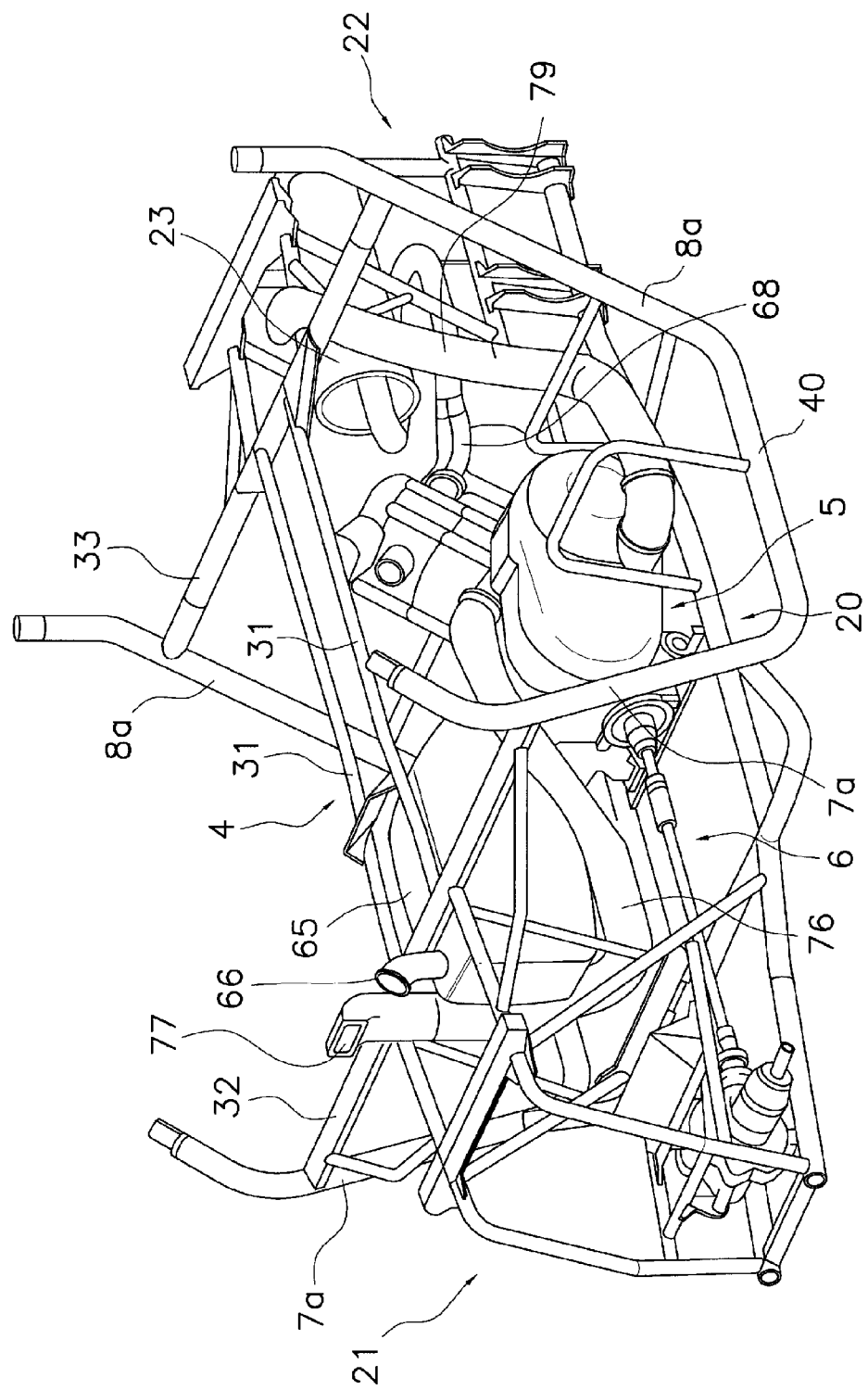
FIG. 4 is a perspective view of a vehicle body frame and main members supported by the vehicle body frame of the all terrain vehicle.
Figure 6:
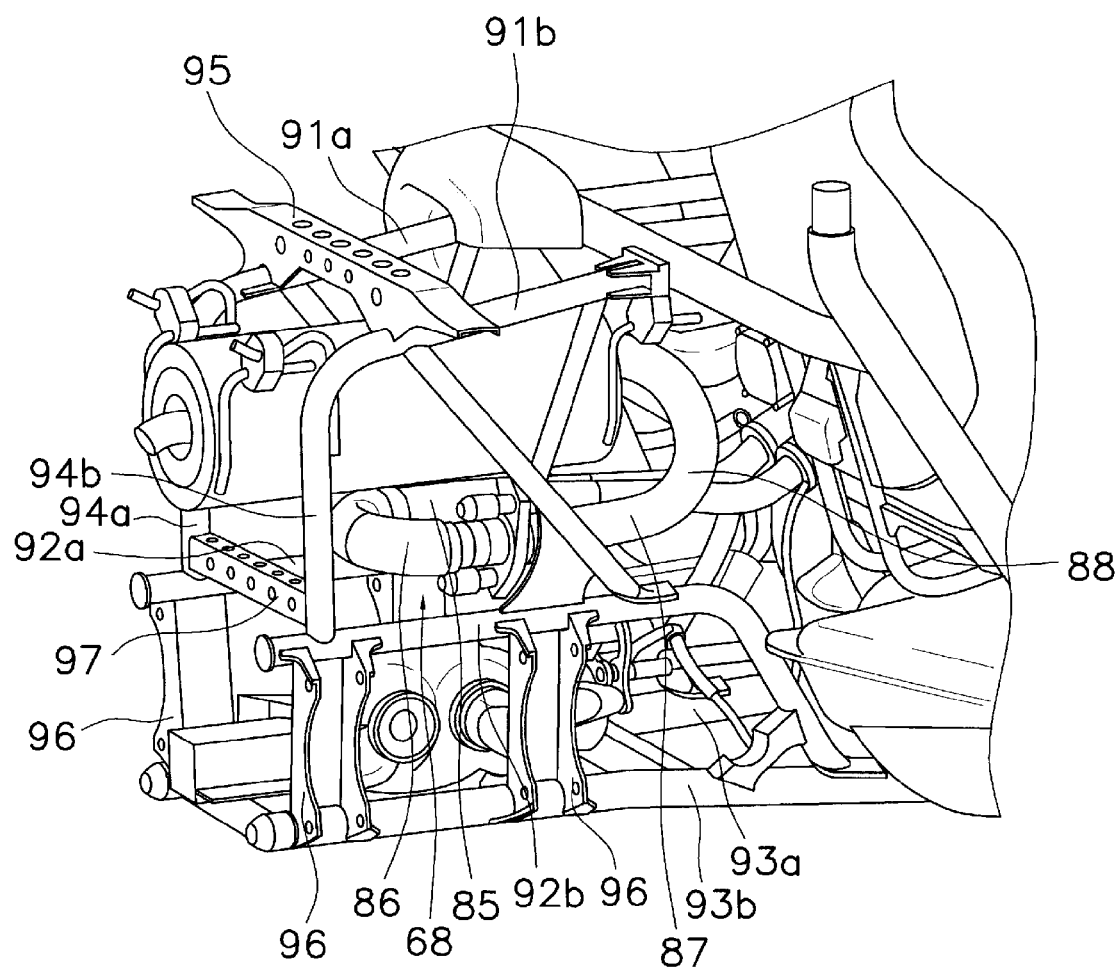
FIG. 6 is a perspective view of a rear frame unit and main members supported by the rear frame unit of the all terrain vehicle.

As illustrated in FIGS. 4 and 6, the vehicle body frame 4 mainly includes a center frame unit 20, a front frame unit 21 and a rear frame unit 22. The center frame unit 20 is positioned at the bottom of the cabin 11. The front frame unit 21 is disposed in front of the center frame unit 20. The front frame unit 21 is included in the vehicle body front portion 12. On the other hand, the rear frame unit 22 is disposed behind the center frame unit 20. The rear frame unit 22 is included in the vehicle body rear portion 14.

The center frame unit 20 preferably includes a plurality of pipe members. The engine unit 5 is supported by the center frame unit 20 through engine brackets (not illustrated in the figure). A pair of intermediate frames 31 is disposed above the center frame unit 20. Each of the intermediate frames 31 is a pipe member extending in a longitudinal direction of the vehicle. The intermediate frames 31 are disposed in approximately transverse center in the interior of the cabin 11. The intermediate frames 31 are disposed between the seats 10a and 10b in the transverse direction of the vehicle. Additionally, the intermediate frames 31 are transversely separated from each other.

Figure 5:
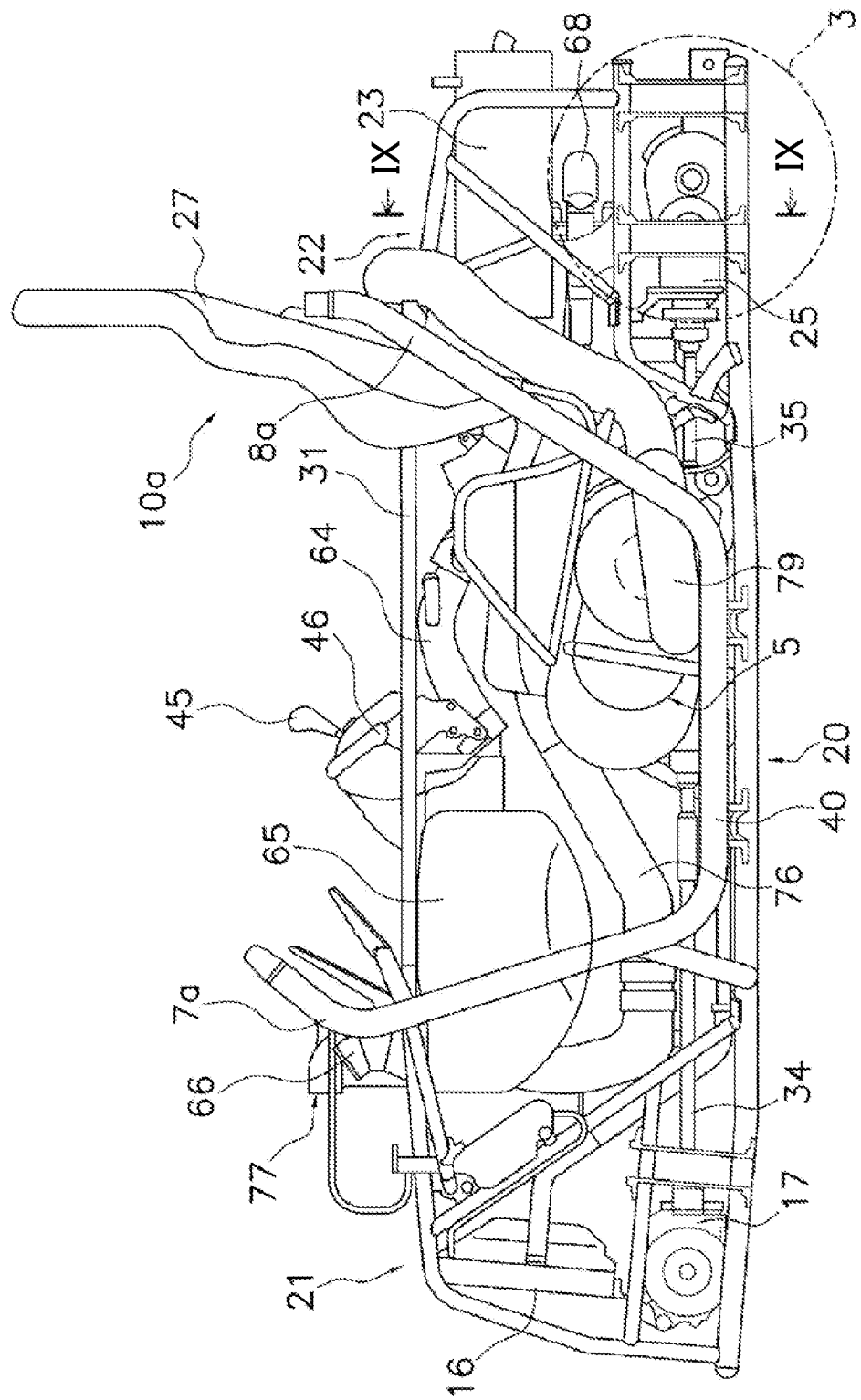
FIG. 5 is a side view of the vehicle body frame and the main members.

Similarly to the center frame unit 20, the front frame unit 21 preferably includes a plurality of pipe members. As illustrated in FIG. 5, the front frame unit 21 supports a variety of components such as a radiator 16, a front gear case 17 and a front suspension mechanism 18 (see FIG. 2).

Similarly to the center frame unit 20, the rear frame unit 22 preferably includes a plurality of pipe members. The rear frame unit 22 supports a variety of components, such as a muffler 23, a rear suspension mechanism 24 (see FIG. 2) for supporting the rear wheels 3 and a rear gear case 25. As illustrated in FIG. 6, the rear frame unit 22 includes a pair of right and left first rear frames 91a and 91b, a pair of right and left second rear frames 92a and 92b, a pair of right and left third rear frames 93a and 93b and a pair of right and left connection frames 94a and 94b.

The first rear frames 91a and 91b are disposed apart in the transverse direction of the vehicle. Each of the first rear frames 91a and 91b extends in the longitudinal direction of the vehicle. The first rear frames 91 and 91b are disposed between the rear wheels 3 in the transverse direction of the vehicle. A first suspension support 95 is attached to the first rear frames 91 and 91b. The first suspension support 95 supports upper ends of rear suspensions 240 of the rear suspension mechanism 24 (see FIG. 1). The first suspension support 95 extends in the transverse direction of the vehicle. The first suspension support 95 bridges the first rear frames 91a and 91b.

The second rear frames 92a and 92b are disposed apart in the transverse direction of the vehicle. Each of the second rear frames 92a and 92b extends in the longitudinal direction of the vehicle. The second rear frame 92a is disposed below the first rear frame 91a, whereas the second rear frame 92b is disposed below the first rear frame 91b. Front portions of the second rear frames 92a and 92b are bent downward. Moreover, the front end of the front portion of the second rear frame 92a is connected to the third rear frame 93a, whereas the front end of the front portion of the second rear frame 92b is connected to the third rear frame 93b.

The third rear frames 93a and 93b are disposed apart in the transverse direction of the vehicle. Each of the third rear frames 93a and 93b extends in the longitudinal direction of the vehicle. The third rear frame 93a is disposed below the second rear frame 92a, whereas the third rear frame 93b is disposed below the second rear frame 92b. The third rear frames 93a and 93b are connected to the center frame unit 20. The second rear frame 92a and the third rear frame 93a are bridged by a single or plurality of second suspension supports 96. Similarly, the second rear frame 92b and the third rear frame 93b are bridged by a single or plurality of second suspension supports 96. The second suspension supports 96 support arm members 241 of the rear suspension mechanism 24 (see FIG. 1). In the present preferred embodiment, the third rear frames 93a and 93b are integrally formed with a plurality of pipe members forming the center frame unit 20.

The connection frame 94a connects a rear portion of the first rear frame 91a and a rear portion of the second rear frame 92a, whereas the connection frame 94b connects a rear portion of the first rear frame 91b and a rear portion of the second rear frame 92b. The connection frames 94a and 94b are disposed apart in the transverse direction of the vehicle. Each of the connection frames 94a and 94b extends in a substantially vertical direction. Additionally, a beam member 97 bridges the connection frames 94a and 94b. In the present preferred embodiment, the first rear frame 91a and the connection frame 94a are formed by bending an integrally formed pipe member. Similarly, the first rear frame 91b and the connection frame 94b are formed by bending an integrally formed pipe member.

Moreover, the cargo bed 13 is disposed on the rear frame unit 22. The cargo bed 13 is detachably attached to the rear frame unit 22. The cargo bed 13 is disposed behind the seats 10a and 10b. The cargo bed 13 is disposed above the first rear frames 91 and 91b. A rear end of the cargo bed 13 is disposed rearward of the connection frames 94a and 94b (see FIG. 1).

The muffler 23 is disposed in a space surrounded by the rear frame unit 22. The muffler 23 is disposed below the cargo bed 13. Additionally, the muffler 23 is disposed in the approximately transverse center portion of the vehicle. An engine exhaust pipe 68 (to be described) is disposed below the muffler 23 within the rear frame unit 22. The muffler 23 and the engine exhaust pipe 68 will be hereinafter explained in detail.

Figure 7:
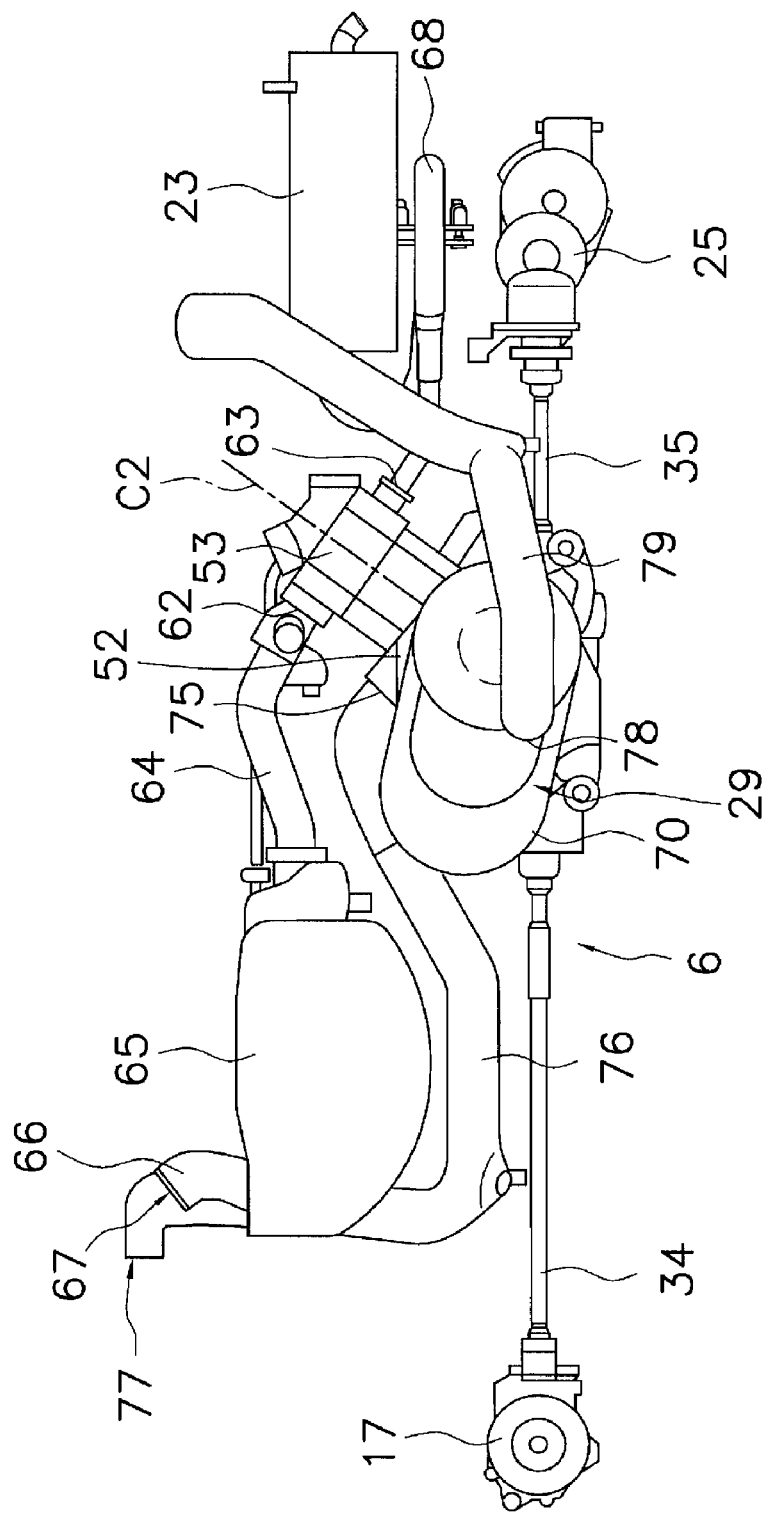
FIG. 7 is a side view of an engine unit and an intake-exhaust related mechanism.

As described above, the engine unit 5 is supported by the center frame unit 20 through the engine bracket. As illustrated in FIGS. 6 and 7, the engine unit 5 includes an engine body 28 and a V-belt continuously variable transmission 29. The continuously variable transmission (CVT) 29 is disposed on the left side of the engine body 28. The engine body 28, the CVT 29 and the intake-exhaust related mechanism connected to the engine unit 5 will be hereinafter explained in detail.

The power transmission mechanism 6 includes a front drive shaft 34, a rear drive shaft 35, a front gear case 17 and a rear gear case 25. The front drive shaft 34 and the rear drive shaft 35 are connected to the output side of the engine unit 5. The front gear case 17 is disposed among the tip of the front drive shaft 34 and the pair of the front wheels 2, whereas the rear gear case 25 is disposed among the tip of the rear drive shaft 35 and the pair of the rear wheels 3. The power transmission mechanism 6 is configured to transmit driving force of the engine unit 5 to the pair of the front wheels 2 and the pair of the rear wheels 3.

Figure 3:
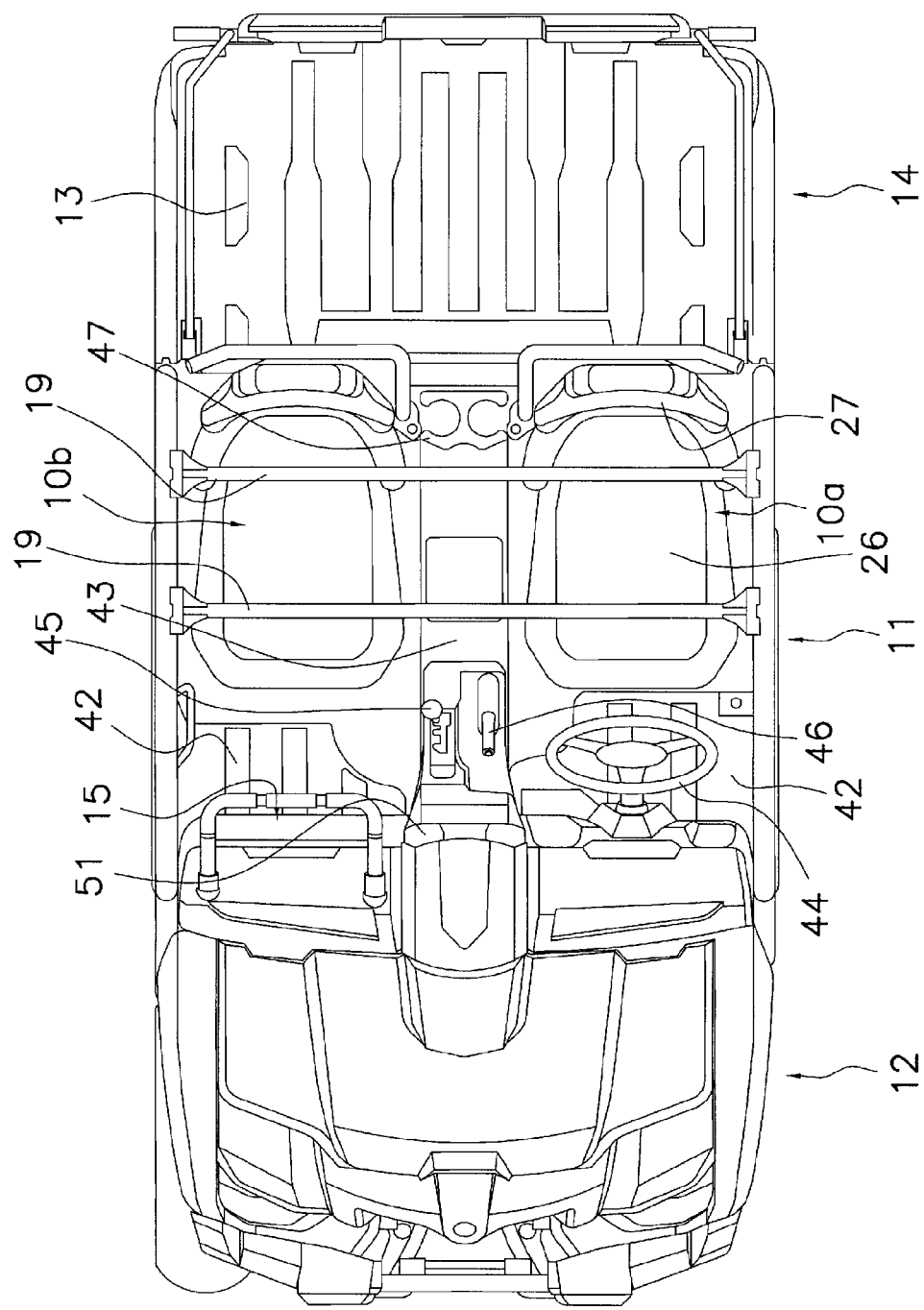
FIG. 3 is a top view of the all terrain vehicle.

As illustrated in FIGS. 1 to 3, the pair of right and left first roof supports 7, the pair of right and left second roof supports 8 and the pair of right and left roof members 9 define a pair of right and left lateral frames of the cabin 11.

The first roof supports 7 define the front ends of the pair of right and left lateral portions of the cabin 11. Each of the first roof supports 7 preferably includes a pipe member extending in the vertical direction. The term "vertical direction" herein is not limited to an exactly perpendicular direction to the horizontal direction, and may be a substantially vertical direction. For example, a component "extending in the vertical direction" may extend in an oblique direction or may be formed in a curved shape. Each of the first roof supports 7 is preferably divided into a lower support 7a and an upper support 7b. The lower support 7a and the upper support 7b are coupled preferably by a single or plurality of bolts, for example. The coupling portion between the lower support 7a and the upper support 7b is positioned at approximately the same height as the upper end of the front panel 15. The lower support 7a slants forward from its lower end to its upper end (i.e., its coupling portion with the upper support 7b). On the other hand, the upper support 7b slants rearward from its lower end (i.e., its coupling portion with the lower support 7a) to its upper end.

Additionally, as illustrated in FIG. 4, a first lateral frame 32 bridges the right and left first roof supports 7. The first lateral frame 32 is a pipe member extending in the transverse direction of the vehicle. The first lateral frame 32 is coupled to the lower supports 7a of the right and left first roof supports 7. Additionally, the front frame unit 21 is coupled to the first lateral frame 32. Moreover, the front ends of the intermediate frames 31 are coupled to the first lateral frame 32. The front ends of the intermediate frames 31 are welded to the first lateral frame 32.

The second roof supports 8 define the rear ends of the pair of right and left lateral portions of the cabin 11. Each of the second roof supports 8 preferably includes a pipe member extending in the vertical direction. The second roof supports 8 are disposed rearward of the first roof supports 7. Similarly to the first roof supports 7, each of the second roof supports 8 is preferably divided into a lower support 8a and an upper support 8b. The lower support 8a and the upper support 8b are coupled preferably by a single or plurality of bolts, for example. The coupling portion between the lower support 8a and the upper support 8b is positioned at approximately the same height as the upper end of the front panel 15. The lower support 8a slants rearward from its lower end to its upper end (i.e., its coupling portion with the upper support 8b). On the other hand, the upper support 8b is disposed approximately-upright in the vertical direction.

Additionally, as illustrated in FIG. 4, a second lateral frame 33 bridges the right and left second roof supports 8. The second lateral frame 33 is a pipe member extending in the transverse direction of the vehicle. The second lateral frame 33 is coupled to the lower supports 8a of the second roof supports 8. Additionally, the rear frame unit 22 is coupled to the second lateral frame 33. Furthermore, the rear ends of the intermediate frames 31 are coupled to the second lateral frame 33. The rear ends of the intermediate frames 31 are welded to the second lateral frame 33.

Each of the roof members 9 preferably includes a pipe member extending in the longitudinal direction. The right/left roof member 9 connects an upper portion of the right/left first roof support 7 and an upper portion of the right/left second roof support 8. The roof members 9 are disposed in an approximately horizontal direction. Additionally, as illustrated in FIGS. 2 and 3, beam members 19 bridge the right and left roof members 9. Each of the beam members 19 preferably includes a pipe member extending in the transverse direction of the vehicle. The beam members 19 are coupled to the roof members 9.

The right and left lateral frameworks of the cabin 11 further include a pair of right and left lower members 40 in addition to the first roof supports 7, the second roof supports 8 and the roof members 9. Each of the lower members 40 preferably includes a pipe member. The right/left lower member 40 connects the lower end of the right/left first roof support 7 and the lower end of the right/left second roof support 8. The lower members 40 are disposed in an approximately horizontal direction. Accordingly, the lower members 40 are opposed to the roof members 9 in the vertical direction.

In the present preferred embodiment, the right/left upper support 7b of the right/left first roof support 7, the right/left upper support 8b of the right/left second roof support 8 and the right/left roof member 9 are formed by bending a piece of a pipe member. Similarly, the right/left lower support 7a of the right/left first roof support 7, the right/left lower support 8a of the right/left second roof support 8 and the right/left lower member 40 are formed by bending a piece of a pipe member.

As illustrated in FIG. 3, the cabin 11 is provided with the front panel 15, a bottom floor panel 42, a center console 43 and the seats 10a and 10b. The floor panel 42 is disposed in front of and below the seats 10a and 10b. The floor panel 42 is used for supporting the feet of a driver and/or a passenger. A steering mechanism 44 is provided in front of the left seat 10a within the cabin 11. The seat 10a includes a seating surface 26 and a seat back 27. On the other hand, the seat 10b is disposed lateral to the seat 10a in the transverse direction of the vehicle. The seat 10b has approximately the same structure as the seat 10a. Each of the seats 10a and 10b is disposed forward of the rear ends of the second roof supports 8 within the cabin 11. More specifically, a portion of the seat back 27 overlaps with the second roof supports 8 in the longitudinal direction of the vehicle and the other portion of the seat back 27 is positioned rearward of the second roof supports 8. However, the seating surface 26 is positioned forward of the rear ends of the second roof supports 8 without exception. As illustrated in FIG. 5, the rear ends of the seat backs 27 of the seats 10a and 10b are positioned rearward of the front ends of the rear wheels 3. Therefore, the seats 10a and 10b partially overlap with the rear wheels 3 in the vertical direction.

Furthermore, as illustrated in FIG. 3, the center console 43 is disposed in an approximately transverse center of the cabin 11. In other words, the center console 43 passes through the interposed space between the right and left seats 10b and 10a. The center console 43 includes an inverse U-shaped panel. The center console 43 is disposed for covering the above and the lateral of the intermediate frames 31. Additionally, the center console 43 is disposed across the cabin 11 in the longitudinal direction of the vehicle. The center console 43 includes an inner space. The center console 43 connects a space positioned forward of the front panel 15, a space positioned under the seats 10a and 10b, and a space positioned rearward of the seats 10a and 10b. Note that the bottom of the inner space of the center console 43 is covered with a plate-shaped bottom guard (not illustrated in the figure). The bottom guard 48 is disposed along the center frame unit 20.

A speed change control lever 45 and a side brake control lever 46 are disposed in the front portion of the center console 43, whereas a bottle receiver 47 is disposed on the rear portion of the center console 43 for receiving a single or plurality of beverage bottles.

As described above, the front panel 15 is a member for sectioning the cabin 11 and the vehicle body front portion 12. The front panel 15 is disposed in front of the seats 10a and 10b. The front panel 15 extends continuously upward from a front portion of the floor panel 42 of the cabin 11. The steering mechanism 44 is provided in the left upper portion of the front panel 15, whereas a meter unit 51, including a speedometer and the like, is disposed in the transverse center portion of the front panel 15. The front end of the center console 43 is connected to a portion of the front panel 15, positioned below the meter unit 51.

Figure 8:
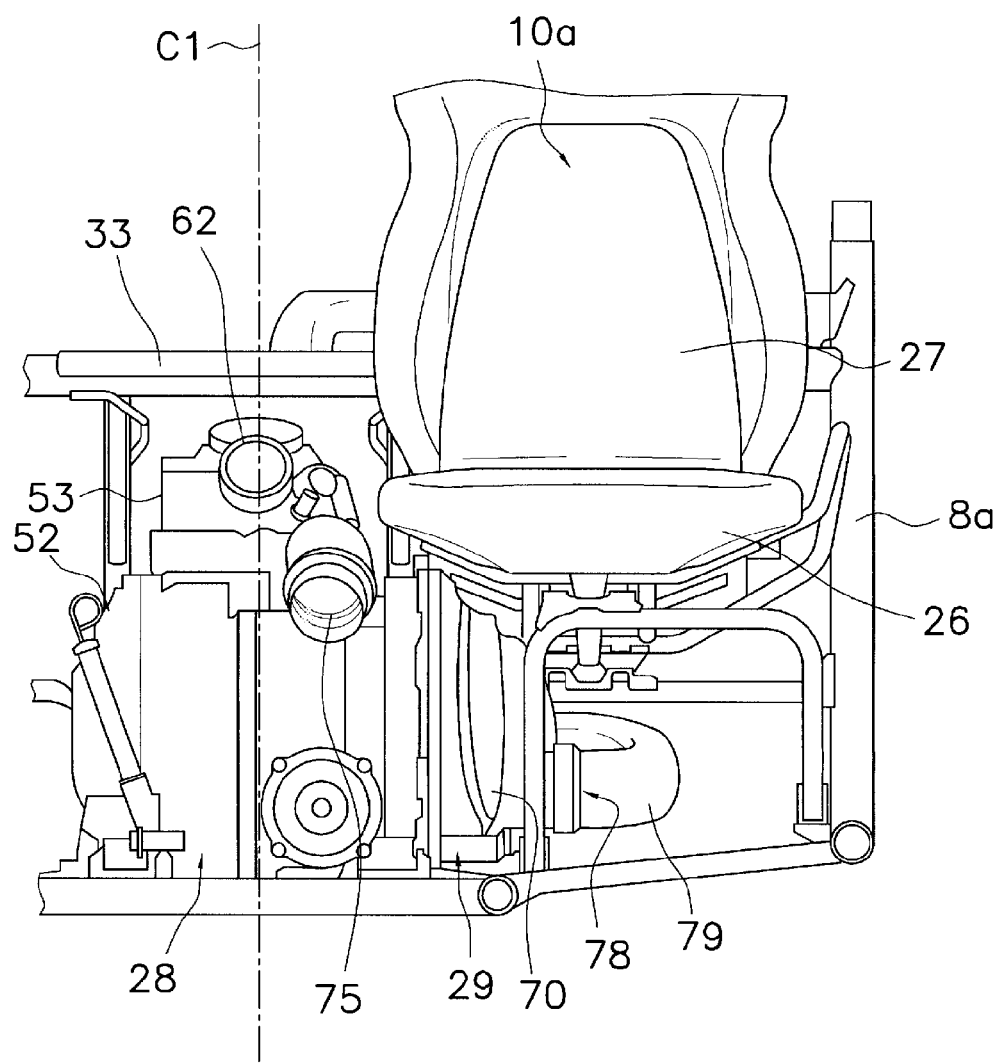
FIG. 8 is a front view for illustrating disposition of the engine unit and a seat.

The engine unit 5 includes the engine body 28 and the CVT 29. Additionally, as illustrated in FIG. 8, the engine body 28 is disposed in the inner space of the center console 43. The engine body 28 is positioned in a center line (see a dashed-dotted line C1) through a transverse center portion of the vehicle. The left portion of the engine body 28 is positioned under the seat 10a. Moreover, as illustrated in FIG. 7, the engine body 28 includes a crank case 52 and a cylinder portion 53. The crank case 52 accommodates a variety of members such as a crank shaft and a speed reduction mechanism (not illustrated in the figure). The cylinder portion 53 is disposed above the rear portion of the crank case 52. The cylinder portion 53 accommodates a piston (not illustrated in the figure). As illustrated with a cylinder axial line C2 of the cylinder portion 53 slants upwardly rearward. The cylinder portion 53 is provided with an engine intake port 62 and an engine exhaust port 63. The engine intake port 62 and the exhaust port 63 communicate with the inner space of the cylinder portion 53.

The engine intake port 62 is provided in the front surface of the cylinder portion 53. The front surface of the cylinder portion 53 slants rearward from its lower side to its upper side. As illustrated in FIG. 8, the engine intake port 62 is positioned between the right and left seats 10b and 10a in the transverse direction of the vehicle. Additionally, the engine intake port 62 is positioned in the interior of the center console 43. As illustrated in FIGS. 4, 5 and 7, an engine intake duct 64 is connected to the engine intake port 62 for introducing external air into the interior of the engine body 28. The engine intake duct 64 extends forward along the center console 43 in the interior of the center console 43. Additionally, the engine intake duct 64 is connected to an air cleaner 65. The air cleaner 65 is disposed in the interior of the center console 43. An intake pipe 66 is connected to the front portion of the upper surface of the air cleaner 65. The intake pipe 66 extends upward from the upper surface of the air cleaner 65, and is bent rearward. The intake pipe 66 is positioned forward of the first lateral frame 32. Additionally, an inlet 67 is provided in the tip of the intake pipe 66.

The engine exhaust port 63 is provided in the rear surface of the cylinder portion 53. The rear surface of the cylinder portion 53 slants rearward from its lower side to its upper side. An engine exhaust pipe 68 is connected to the engine exhaust port 63 for discharging air to the outside from the interior of the engine body 28. The engine exhaust pipe 68 extends rearward from the engine exhaust port 63, and is folded to the forward in the rear frame unit 22. The engine exhaust pipe 68 is connected to the muffler 23 disposed in the rear frame unit 22. Disposition of the muffler 23 and the engine exhaust pipe 68 will be hereinafter explained in detail.

The CVT 29 is disposed on the left side of the engine body 28. As illustrated in FIG. 8, the CVT 29 is disposed under the seat 10a. Additionally, the CVT 29 includes a transmission case 70. The transmission case 70 is attached to the left surface of the crank case 52. The transmission case 70 accommodates a variety of components such as a primary pulley, a secondary pulley and a belt wrapped around the primary pulley and the secondary pulley (not illustrated in the figure).

As illustrated in FIGS. 7 and 8, an intake port 75 is provided in the upper surface of the crank case 52. The intake port 75 is disposed between the right and left seats 10b and 10a in the transverse direction of the vehicle. Additionally, the intake port 75 is positioned in the interior of the center console 43.

An intake duct 76 is connected to the intake port 75 for introducing external air into the interior of the CVT 29. The intake duct 76 extends forward from the upper surface of the crank case 52. The intake duct passes through the interior of the center console 43. The intake duct 76 vertically overlaps with the engine intake duct 64 in the interior of the center console 43. The intake duct 76 passes through a space below the air cleaner 65. The intake duct 76 is bent upward from the position below the air cleaner 65. The intake duct 76 passes through the right side of the air cleaner 65 in the front frame unit 21. Additionally, the intake duct 76 extends to a position higher than the air cleaner 65. An inlet 77 is provided in the tip of the intake duct 76. The inlet 77 is disposed forward of the first lateral frame 32 and the front panel 15.

As illustrated in FIG. 7, an exhaust port 78 is provided in the left surface of the transmission case 70. An exhaust duct 79 is connected to the exhaust port 78 for discharging air to the outside from the interior of the CVT 29. The exhaust duct 79 extends rearward from the left surface of the transmission case 70. As illustrated in FIGS. 4 and 5, the exhaust duct 79 is bent transversely inward at a position rearward of the seat 10a. Additionally, the exhaust duct 79 extends upward at a position behind the seat 10a. The exhaust duct 79 passes through behind the seat 10a and the left side of the rear frame unit 22. The exhaust duct 79 extends to a higher position than the muffler 23. An outlet is provided in the tip of the exhaust duct 79.

As illustrated in FIG. 6, the engine exhaust pipe 68 preferably includes a first portion 85, a second portion 86, a third portion 87 and a fourth portion 88. The first portion 85 is connected to the rear surface of the cylinder portion 53 of the engine unit 5. The first portion 85 rearwardly extends along the longitudinal direction of the vehicle. The connection portion of the first portion 85 to the cylinder portion 53 preferably has a two-way branched shape. The second portion 86 is connected to the first portion 85. The second portion 86 preferably has a U-shaped configuration. The third portion 87 is connected to the second portion 86. The third portion 87 forwardly extends along the longitudinal direction of the vehicle. The first portion 85 and the third portion 87 are aligned in the transverse direction of the vehicle. The first portion 85, the second portion 86 and the third portion 87 are disposed in a space surrounded by the first rear frames 91a and 91b, the second rear frames 92a and 92b and the connection frames 94a and 94b. Additionally, the first portion 85, the second portion 86 and the third portion 87 are disposed in roughly the same horizontal plane. The fourth portion 88 is connected to the third portion 87. The fourth portion 88 preferably has a U-shaped configuration. The fourth portion 88 extends obliquely upward from the front end of the third portion 87. The fourth portion 88 couples the third portion 87 and the muffler 23.

Figure 9:
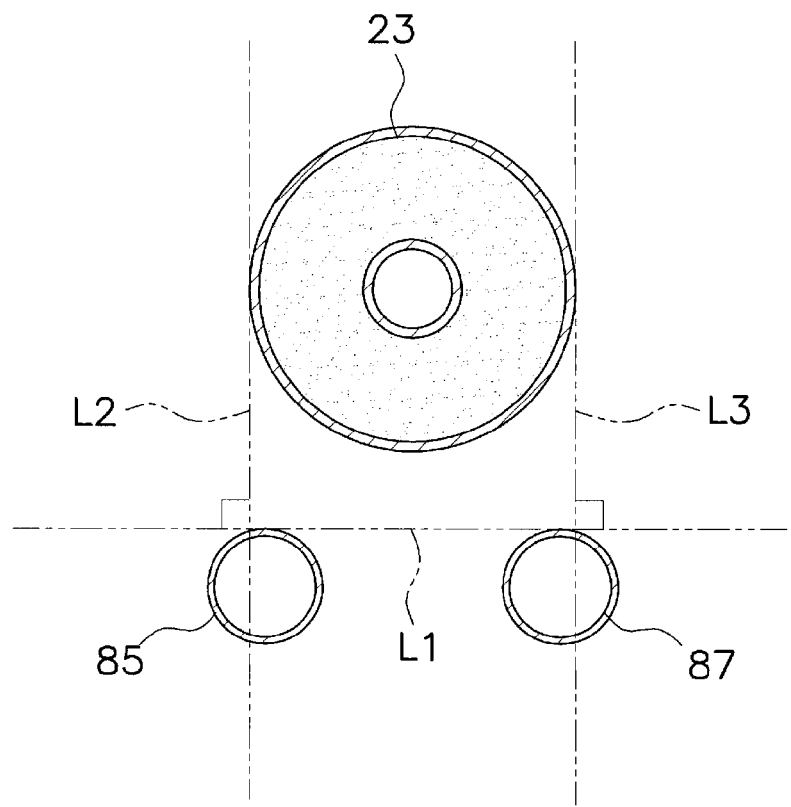
FIG. 9 is a schematic cross-sectional view for illustrating a positional relationship between first and third portions of an engine exhaust pipe and a muffler.

The muffler 23 is connected to the fourth portion 88 of the engine exhaust pipe 68. The muffler 23 is disposed in a space surrounded by the first rear frames 91a and 91b, the second rear frames 92a and 92b, and the connection frames 94a and 94b. The rear end of the muffler 23 is positioned rearward of the connection frames 94a and 94b. The muffler 23 is disposed between the connection frames 94a and 94b in the transverse direction of the vehicle. Additionally, the muffler 23 is disposed rearward of the seats 10a and 10b. The front end of the muffler 23 is positioned forward of the rear ends of the seat backs 27. In a side view of the vehicle, the seats 10a and 10b partially overlap with the muffler 23 in the vertical direction. Furthermore, the muffler 23 is disposed above the engine exhaust pipe 68. FIG. 9 illustrates a positional relation between the muffler 23 and the engine exhaust pipe 68. Specifically, FIG. 9 illustrates a schematic cross-sectional view of the first portion 85, the third portion 87 and the muffler 23 (a cross section IX-IX in FIG. 5) at a predetermined longitudinal position of the vehicle. Note the cross-sectional view is seen from the back of the vehicle. The first portion 85 and the third portion 87 are aligned in the transverse direction of the vehicle. Additionally, the first portion 85 and the third portion 87 are positioned at approximately the same height. The muffler 23 is disposed above and opposed to the first portion 85 and the third portion 87. Additionally, the muffler 23 is arranged such that the first portion 85 and the third portion 87 at least partially overlap with an area formed between two tangent lines L2 and L3 of the muffler 23. The tangent lines L2 and L3 are herein perpendicular or substantially perpendicular to a tangent line L1 shared by the first portion 85 and the third portion 87.

In the present preferred embodiment, the aforementioned relationship is true with respect to arbitrary cross sections of the first and third portions 85 and 87 extending below the muffler 23 along the longitudinal direction of the vehicle.

According to the all terrain vehicle of the present preferred embodiment, the muffler 23 is arranged such that the first portion 85 and the third portion 87 of the engine exhaust pipe 68 at least partially overlap with the area formed between the tangent lines L2 and L3 of the muffler 23, perpendicular or substantially perpendicular to the tangent line L1 shared by the first portion 85 and the third portion 87. Therefore, it is possible to dispose the muffler 23 and the engine exhaust pipe 68 in a small space and simultaneously keep the necessary length of the engine exhaust pipe 68. As a result, it is possible to compactly form the vehicle.

According to the all terrain vehicle of the present preferred embodiment, the muffler 23 is disposed between the connection frames 94a and 94b in the transverse direction of the vehicle. In other words, the muffler 23 and the engine exhaust pipe 68 are disposed inward of the connection frames 94a and 94b in the transverse direction of the vehicle. On the other hand, the rear wheels 3 are disposed outward of the connection frames 94a and 94b in the transverse direction of the vehicle. It is therefore easy to produce a clearance between the rear wheels 3 and the muffler 23 and a clearance between the rear wheels 3 and the engine exhaust pipe 68. In other words, it is possible to dispose the muffler 23 and the engine exhaust pipe 68 with greater flexibility. As described above, it is consequently possible to dispose the muffler 23 and the engine exhaust pipe 68 in a small space.

According to the all terrain vehicle of the present preferred embodiment, the cylinder axial line C2 slants upward from its front side to its rear side. If the cylinder axial line C2 is horizontally positioned in the longitudinal direction of the vehicle, the engine exhaust pipe 68 extends downward from the cylinder portion 53. In this case, the engine exhaust pipe 68 is required to have a lot of bent portions for guiding itself to the muffler 23 disposed thereabove. Alternatively, the engine exhaust pipe 68 is required to have a further elongated bent portion for the purpose. In both cases, a large space is necessary for disposing the engine exhaust pipe 68. On the other hand, when the cylinder axial line C2 slants as described above, the engine exhaust pipe 68 is connected to the rear surface of the engine unit 5 and extends obliquely rearward and downward therefrom. Therefore, it is possible to reduce the number of bent portions of the engine exhaust pipe 68, compared to the aforementioned structure that the engine exhaust pipe 68 extends downward from the engine unit 5. Alternatively, it is possible to shorten the bent portion of the engine exhaust pipe 68. As a result, it is possible to reduce a space for disposing the engine exhaust pipe 68.

According to the all terrain vehicle of the present preferred embodiment, the seats 10a and 10b at least partially overlap with the rear wheels 3 in the vertical direction. Therefore, the rear wheels 3 are disposed close to the cabin 11 in the longitudinal direction of the vehicle. As a result, it is possible to compactly form the vehicle in the longitudinal direction of the vehicle.

According to the all terrain vehicle of the present preferred embodiment, the seats 10a and 10b at least partially overlap with the muffler 23 in the vertical direction of the vehicle. Therefore, the muffler 23 is disposed close to the cabin 11 in the longitudinal direction of the vehicle. As a result, it is possible to compactly form the vehicle in the longitudinal direction of the vehicle.

According to the all terrain vehicle of the present preferred embodiment, the connection frames 94a and 94b are positioned forward of the rear end of the cargo bed 13. Therefore, it is possible to reduce the longitudinal length of the entire vehicle under the condition that the cargo bed 13 is removed therefrom. Transportation of the vehicle will be thereby more convenient. In the container transportation, for instance, it is possible to simultaneously accommodate a large number of all terrain vehicles in a container.

The specific structure and disposition of the all terrain vehicle of the present invention are not limited to the aforementioned preferred embodiment. They are allowed to be changed without departing from the scope of the present invention.

For example, the aforementioned preferred embodiment exemplifies the structure that each of the roof supports is preferably divided into the upper support and the lower support. However, the present invention is applicable to a type of vehicle that a roof support is only composed of the upper support of the aforementioned preferred embodiment. Additionally, in the aforementioned preferred embodiment, the present invention is preferably applied to a type of vehicle provided with two seats. However, the present invention is similarly applicable to a type of vehicle provided with a single or plurality of rear seats in addition to the front seats. Also, the shape of the lateral frames is not limited to the liner shape as described in the aforementioned preferred embodiment. For example, the lateral frames may be formed in a vertically curved shape or a longitudinally curved shape.

Figure 10:
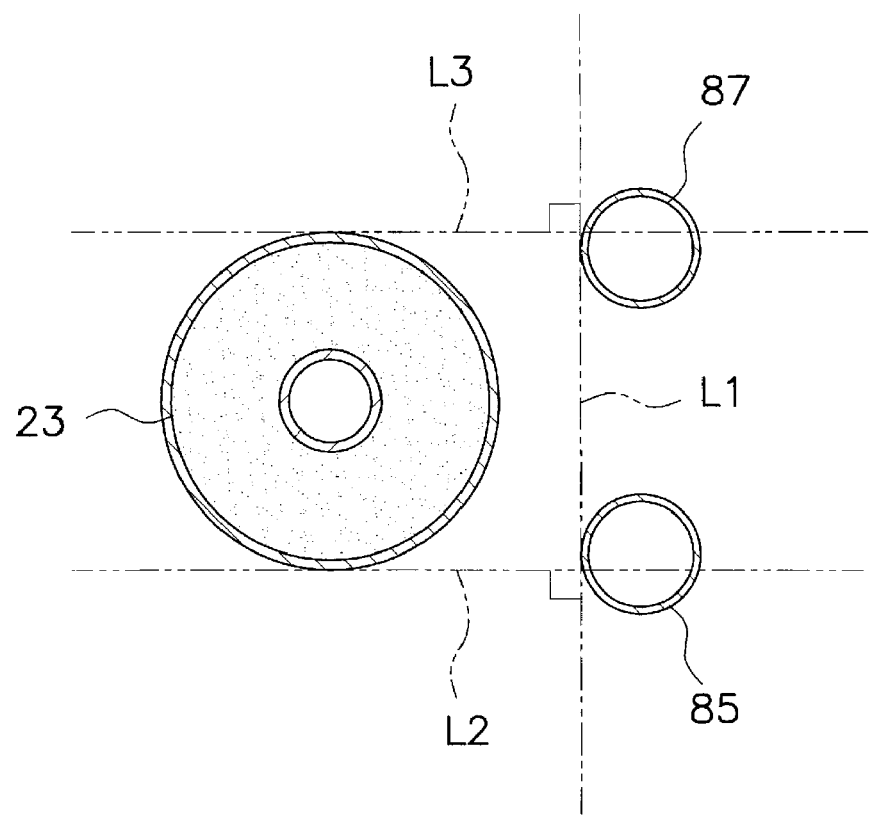
FIG. 10 is a schematic cross-sectional view for illustrating a positional relationship between first and third portions of an engine exhaust pipe and a muffler in another preferred embodiment of the present invention.

Moreover, in the aforementioned preferred embodiment, the first portion 85 and the third portion 87 are preferably aligned in the transverse direction of the vehicle. The muffler 23 is disposed above the first portion 85 and the third portion 87. However, the muffler 23 may be disposed below the first portion 85 and the third portion 87. Alternatively, the first portion 85 and the third portion 87 may be disposed one above the other as illustrated in FIG. 10. In this case, the muffler 23 may be disposed lateral to and opposed to the first portion 85 and the third portion 87 in the transverse direction of the vehicle. Similarly to the aforementioned preferred embodiment, the muffler 23 is herein arranged such that the first portion 85 and the third portion 87 overlap with an area formed between two tangent lines L2 and L3 of the muffler 23. The tangent lines L2 and L3 are perpendicular or substantially perpendicular to a tangent line L1 shared by the first portion 85 and the third portion 87. Dispositions of the muffler 23, the first portion 85 and the third portion 87 may be arbitrarily set as long as the herein-described relationship is true to cross sections of the muffler 23, the first portion 85 and the third portion 87 at a predetermined longitudinal position.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. An all terrain vehicle comprising:
a pair of right and left front wheels;
at least a pair of right and left rear wheels;
a vehicle body frame arranged to support the front wheels and the rear wheels;
a pair of right and left first roof supports provided at lateral sides of the vehicle body frame in a transverse direction of the vehicle, each of the first roof supports including a pipe member extending in a substantially vertical direction of the vehicle;
a pair of right and left second roof supports provided at the lateral sides of the vehicle body frame in the transverse direction of the vehicle, the second roof supports disposed rearward of the first roof supports in a longitudinal direction of the vehicle, each of the second roof supports including a pipe member extending in the substantially vertical direction of the vehicle;
a pair of right and left roof members, the right roof member connecting an upper portion of the right first roof support and an upper portion of the right second roof support, the left roof member connecting an upper portion of the left first roof support and an upper portion of the left second roof support;
a seat disposed forward of rear ends of the second roof supports in the longitudinal direction of the vehicle in a side view of the vehicle;
an engine unit at least partially disposed under the seat;
an exhaust pipe including:
 a first portion connected to a rear surface of the engine unit and extending rearward therefrom in the longitudinal direction of the vehicle;
 a second portion connected to the first portion and having a substantially U-shaped configuration; and
 a third portion connected to the second portion and extending forward therefrom in the longitudinal direction of the vehicle; and
a muffler connected to the exhaust pipe and arranged such that the first portion and the third portion at least partially overlap with an area defined between two tangent lines of the muffler in a cross-section at a predetermined longitudinal position of the vehicle, the tangent lines of the muffler being positioned perpendicular or substantially perpendicular to a tangent line shared by the first portion and the third portion.

2. The all terrain vehicle according to claim 1, wherein the vehicle body frame includes:
a rear suspension arranged to support the rear wheels;
a pair of right and left first rear frames extending in the longitudinal direction of the vehicle and disposed between the rear wheels in the transverse direction of the vehicle, each of the right and left first rear frames having a support portion arranged to support the rear suspension;
a pair of right and left second rear frames extending in the longitudinal direction of the vehicle and disposed below the right and left first rear frames; and
a pair of right and left connection frames connecting a rear portion of the right first rear frame and a rear portion of the right second rear frame, the left connection frame connecting a rear portion of the left first rear frame and a rear portion of the left second rear frame; and
the muffler is arranged between the connection frames in the transverse direction of the vehicle.

3. The all terrain vehicle according to claim 1, wherein a cylinder axial line of the engine unit slants upwardly to a rearward portion in the longitudinal direction of the vehicle, and the muffler is arranged above the first portion and the third portion of the exhaust pipe.

4. The all terrain vehicle according to claim 1, wherein the seat at least partially overlaps with the rear wheels in the vertical direction of the vehicle.

5. The all terrain vehicle according to claim 1, wherein the seat at least partially overlaps with the muffler in the vertical direction of the vehicle.

6. The all terrain vehicle according to claim 1, further comprising a cargo bed detachably attached to the vehicle body frame, wherein the vehicle body frame includes:
a rear suspension arranged to support the rear wheels;
a pair of right and left first rear frames extending in the longitudinal direction of the vehicle and disposed below the cargo bed and between the rear wheels in the transverse direction of the vehicle, each of the right and left first rear frames having a support portion arranged to support the rear suspension;
a pair of right and left second rear frames extending in the longitudinal direction of the vehicle and disposed below the right and left first rear frames; and
a pair of right and left connection frames disposed forward of a rear end of the cargo bed in the longitudinal direction of the vehicle and connecting a rear portion of the right first rear frame and a rear portion of the right second rear frame, the left connection frame connecting a rear portion of the left first rear frame and a rear portion of the left second rear frame.

7. The all terrain vehicle according to claim 1, wherein the first portion and the third portion are aligned in the transverse direction of the vehicle, the muffler is disposed above or below the first portion and the third portion, and the muffler is opposed to the first portion and the third portion.

8. The all terrain vehicle according to claim 1, wherein the first portion and the third portion are aligned in the vertical direction of the vehicle, the muffler is disposed laterally relative to the first portion and the third portion in the transverse direction of the vehicle, and the muffler is opposed to the first portion and the third portion.

* * * * *